(12) United States Patent
Grimberg

(10) Patent No.: US 8,274,050 B2
(45) Date of Patent: Sep. 25, 2012

(54) RADIOMETRY USING AN UNCOOLED MICROBOLOMETER DETECTOR

(75) Inventor: Ernest Grimberg, Kiryat Byalik (IL)

(73) Assignee: Opgal Ltd., Carmiel (IL)

( * ) Notice: Subject to any disclaimer, the term of this patent is extended or adjusted under 35 U.S.C. 154(b) by 625 days.

(21) Appl. No.: 10/567,438

(22) PCT Filed: Aug. 3, 2004

(86) PCT No.: PCT/IL2004/000714
§ 371 (c)(1),
(2), (4) Date: Feb. 7, 2006

(87) PCT Pub. No.: WO2005/015143
PCT Pub. Date: Feb. 17, 2005

(65) Prior Publication Data
US 2008/0210872 A1    Sep. 4, 2008

(30) Foreign Application Priority Data

Aug. 11, 2003 (IL) .......................................... 157344

(51) Int. Cl.
*G01J 5/00* (2006.01)
*G01J 5/06* (2006.01)

(52) U.S. Cl. ............. 250/338.1; 250/336.1; 250/339.02; 250/339.04; 250/339.09; 250/341.5; 374/1

(58) Field of Classification Search ............... 374/1, 134, 374/132, 133, 2; 250/330, 332, 339.02, 339.09, 250/336.1, 338.1, 339.04, 341.5, 358.1
See application file for complete search history.

(56) References Cited

U.S. PATENT DOCUMENTS

| | | | | |
|---|---|---|---|---|
| 4,907,895 A | * | 3/1990 | Everest | 374/130 |
| 5,925,875 A | * | 7/1999 | Frey | 250/208.1 |
| 5,994,701 A | * | 11/1999 | Tsuchimoto et al. | 250/351 |
| 6,476,392 B1 | | 11/2002 | Kaufman et al. | |
| 6,515,285 B1 | * | 2/2003 | Marshall et al. | 250/352 |
| 7,030,378 B2 | * | 4/2006 | Allen et al. | 250/332 |
| 2002/0074499 A1 | * | 6/2002 | Butler | 250/338.1 |

FOREIGN PATENT DOCUMENTS

| | | |
|---|---|---|
| EP | 0588644 | 3/1994 |
| EP | 0837600 | 4/1998 |
| JP | 06-094537 | 4/1994 |
| JP | 2000-131149 | 5/2000 |
| JP | 2000131149 | 5/2000 |
| JP | 2001-124629 | 5/2001 |

(Continued)

OTHER PUBLICATIONS

Response Dated Feb. 5, 2010 to Notice of Reason for Rejection Dated Nov. 10, 2009 From the Japanese Patent Office Re.: Applicaiton No. 2006-523113.

(Continued)

*Primary Examiner* — David Porta
*Assistant Examiner* — Yara Green

(57) ABSTRACT

An infra-red imaging camera comprises focusing optics for gathering infra-red energy from an external scene, and an uncooled and unshielded detector arranged to detect infra red energy. Internal temperature sensing together with approximation of the temperature response of the camera provides a time varying calibration that allows the infra-red energy received at the detector to be used as a temperature measurement for objects in the camera's field of view.

18 Claims, 11 Drawing Sheets

FOREIGN PATENT DOCUMENTS

| | | |
|---|---|---|
| JP | 2002-310804 | 10/2002 |
| WO | WO 01/84118 | 8/2001 |
| WO | WO 01/84118 | 11/2001 |
| WO | WO 2005/015143 | 2/2005 |

OTHER PUBLICATIONS

Response Dated Jun. 30, 2010 to Notice of Reason for Rejection of Apr. 16, 2010 From the Japanese Patent Office Re.: Application No. 2006-523113.
Response Dated Dec. 5, 2010 to Office Action of Aug. 9, 2009 From the Israeli Patent Office Re.: Application No. 173541.
Translation of Notice of the Reason for Rejection Dated Jan. 7, 2011 From the Korean Intellectual Property Office Re. Application No. 2006-7002832.
Office Action Dated Feb. 6, 2006 From the Israeli Patent Office Re.: Application No. 157344.
Communication Pursuant to Article 94(3) EPC Dated Aug. 7, 2009 From the European Patent Office Re.: Application No. 04745054.9.
Communication Pursuant to Article 94(3) EPC Dated Jul. 11, 2008 From the European Patent Office Re.: Application No. 04745054.9.
Examination Report Dated Sep. 26, 2007 From the Government of India, Patent Office Re.: Application No. 825/CHENP/2006.
Office Action Dated Aug. 9, 2009 From the Israeli Patent Office Re.: Application No. 173541 and Its Translation Into English.
Response Dated Jan. 7, 2010 to Communication Pursuant to Article 94(3) EPC of Aug. 7, 2009 From the European Patent Office Re.: Application No. 04745054.9.
Response Dated Dec. 17, 2009 to Official Action of Nov. 4, 2009 From the US Patent and Trademark Office Re.: U.S. Appl. No. 10/567,438.
Translation of Notice of Reason for Rejection Dated Nov. 10, 2009 From the Japanese Patent Office Re.: Applicaiton No. 2006-523113.
Translation of Notice of Reason for Rejection Dated Apr. 16, 2010 From the Japanese Patent Office Re.: Application No. 2006-523113.
Written Opinion Dated Jun. 19, 2006 From the Intellectual Property Office of Singapore Issued by the Australian Government, IP Australia Re.: Application No. SG 200600746-2.
Communication Pursuant to Article 94(3) EPC Dated Feb. 25, 2011 From the European Patent Office Re.: Application No. 04745054.9.
Response Dated Feb. 13, 2011 to Notice of the Reason for Rejection of Jan. 7, 2011 From the Korean Intellectual Property Office Re. Application No. 2006-7002832.
Translation of the Reason for Rejection Dated May 6, 2011 From the Korean Intellectual Property Office Re. Application No. 2011-7005176.
Response Dated Jun. 20, 2011 to Reason for Rejection of May 6, 2011 From the Korean Intellectual Property Office Re. Application No. 2011-7005176.
Response Dated Jun. 23, 2011 to Communication Pursuant to Article 94(3) EPC of Feb. 25, 2011 From the European Patent Office Re.: Application No. 04745054.9.
Translation of Notice of Reason for Rejection Dated Jan. 31, 2012 From the Korean Intellectual Property Office Re. Application No. 2011-7005176.
Response Dated Oct. 31, 2011 to Notice of the Reason for Rejection of Sep. 27, 2011 From the Korean Intellectual Property Office Re. Application No. 2006-7002832.
Translation of Notice of the Reason for Rejection Dated Sep. 27, 2011 From the Korean Intellectual Property Office Re. Application No. 2006-7002832.

\* cited by examiner

High pass filter frequency response. Time filter is the MTF inverse approximation for a detector that contains 320 by 240 elements

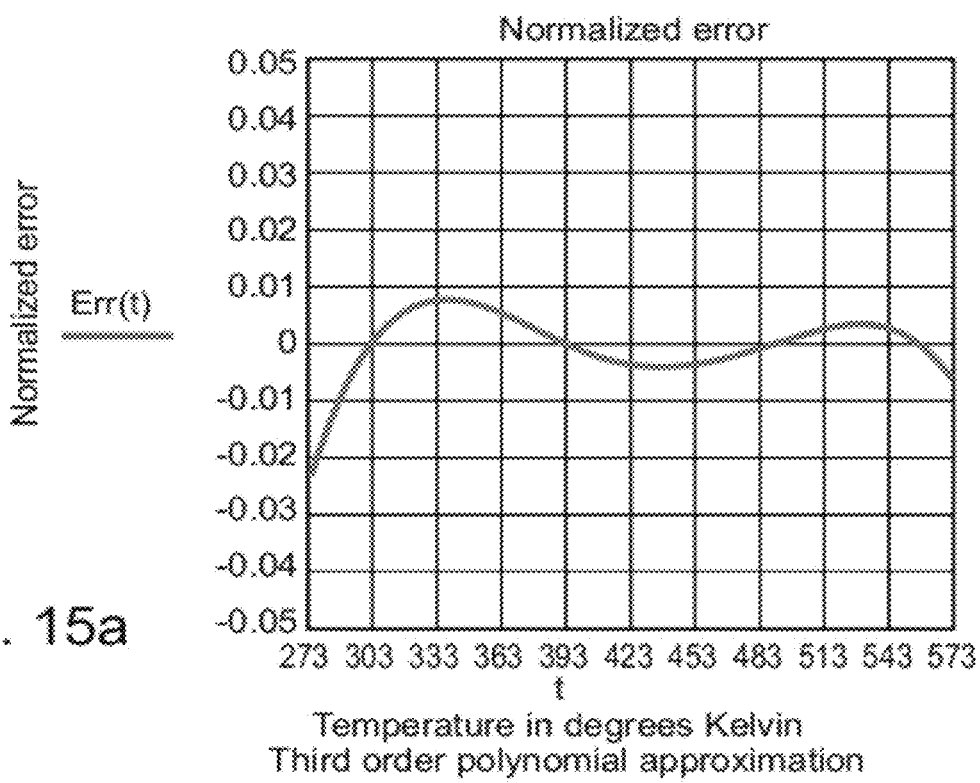
Fig. 15a  Third order polynomial approximation
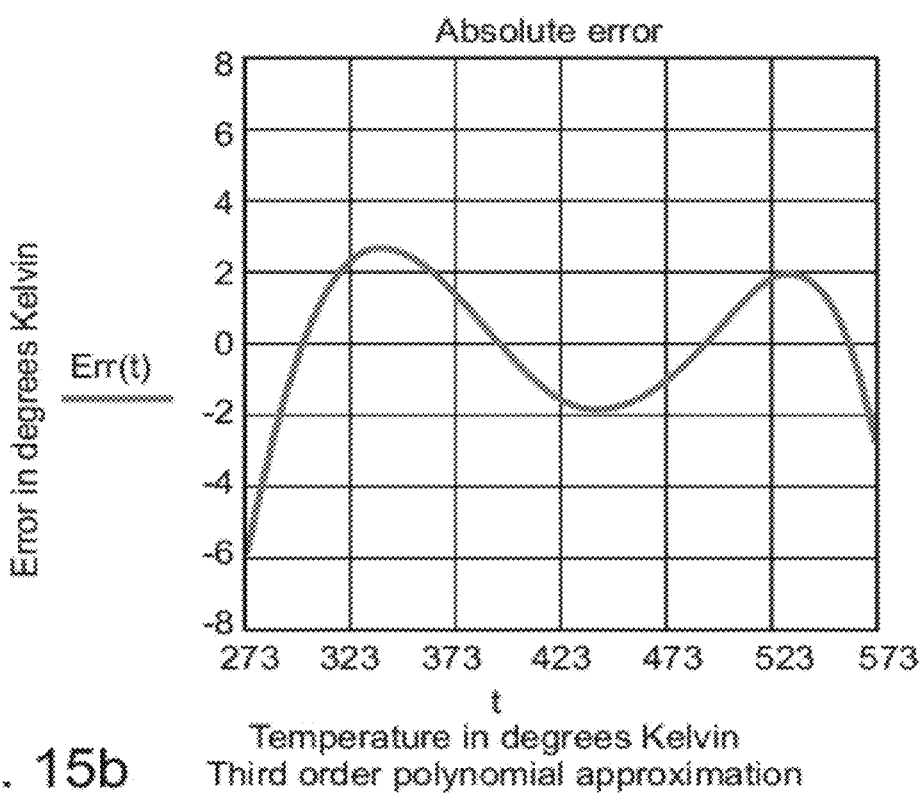
Fig. 15b  Third order polynomial approximation Fourier transform of camera impulse response

RADIOMETRY USING AN UNCOOLED MICROBOLOMETER DETECTOR

RELATED APPLICATIONS

This application is a National Phase Application of PCT Application No. PCT/IL2004/000714 having International Filing Date of Aug. 3, 2004, which claims priority from Israel Patent Application No. 157344, filed on Aug. 11, 2003.

FIELD AND BACKGROUND OF THE INVENTION

The present embodiments relate to radiometry using an uncooled Microbolometer detector and more particularly but not exclusively to obtaining more accurate results from an uncooled Microbolometer so as to extend its useful range of applications into areas previously only feasible with the more power consuming and more complex vacuum packages. Infra-red (IR) detectors detect the IR radiation emitted from an object, and are used for non-contact measurement of temperatures in many industrial and medical applications. These applications include stress testing electronic components, measuring human temperature, surveillance systems including long range and nighttime surveillance systems, fire detection, and portable night vision equipment.

IR detectors generally operate by detecting the differences in the thermal radiance of various objects in a scene. The difference is converted into an electrical signal which is then processed and analyzed and/or displayed. Imaging radiometers, such as forward-looking IR (FLIR) cameras, utilize an array of IR sensors to provide a two-dimensional thermal image. The more simple detectors are typically used to provide an image, since a simple differential over the field of view provides an image which can be meaningful to the eye. However, generally more sophisticated equipment is required if the intention is to measure a temperature from the received radiation.

In many cases the sensor array is a microbolometer array. Microbolometers are IR radiation detectors that are fabricated on a substrate material using integrated circuit fabrication techniques. Microbolometer detector arrays may be used to sense the incident radiation. Each microbolometer detector of an array absorbs incident radiation which leads to a corresponding change in its resistance due to its change in temperature. With each microbolometer functioning as a pixel, a two-dimensional image or picture representation of the incident infrared radiation may be generated using a suitable array of the microbolometers.

FLIR cameras have non-uniform responses to uniform incident infrared radiation. This is due to:
  a. small variations in the detectors' electrical and thermal properties as a result of the manufacturing process,
  b. variation of the electromagnetic wave intensity as a function of emitting/absorbing angle,
  c. optics vignetting,
  d. optics change in temperature, etc These non-uniformities in the microbolometer response characteristics are generally corrected to produce an electrical signal with adequate signal-to-noise ratio for image processing and display.

As is well known in the art, offset and gain information associated with each of the detectors is obtained by a calibration technique known as non-uniformity correction (NUC), in which the microbolometer array is subjected to several scenes of uniform radiation at different levels. During regular use a controlled shutter is closed to obscure the microbolometer array's field of view (FOV), so that all of the sensors view a uniform temperature scene. The response of each of the detectors is used to derive a corresponding offset value. The shutter is then opened, and normal imaging operation is resumed. The derived offsets are used to correct the response from each pixel in the array. Furthermore, in order to compensate for the optics and new temperature distributions within the internal camera parts the detector itself is stabilized in temperature so that its response is relatively stable. While the shutter blocks the detector's FOV, an additional correction of the microbolometer array response, known as bad pixel replacement (BPR) updating, may be performed. The signal from each detector pixel is checked to determine whether the detector pixel is functioning properly. If the detector pixel is found to be inoperative, or its signal properties drastically differ from the average properties, then the value of the corresponding pixel is determined by other means, such as taking an average of the surrounding pixels. An alternative technique is to perform sorting instead of averaging.

There are several main obstacles related to building an imaging radiometer, especially when the instrument is based on an uncooled microbolometer detector array. A simple uncooled microbolometer array detector does not contain any radiation shield. That is to say in the more sophisticated detectors there are radiation shields which protect the detector from IR radiation from internal camera parts. The simple detectors do not contain such a shield, making the package smaller and the optics simpler, but meaning that the simple detector exchanges energy with the internal camera parts and its vacuum package through a solid angle of $2\pi$ radians.

Indeed it is noted that the detector always exchanges energy through a solid angle of $2\pi$ radians. However, conventional more sophisticated radiometric detectors block the detector field of view using the above mentioned radiation shields. Furthermore the radiation shields are kept at a constant temperature, which can therefore be compensated for relatively easily. Returning to the simple detectors and in fact most of the energy exchanged is between the detector and the internal camera. After all, the internal camera parts are much nearer than the objects being imaged. Only a very small fraction (usually about 10%) of the energy exchanged by the detector comes from the scene it is intended to be imaging. A very small change in temperature of the internal camera parts therefore may produce a large change of the detector output signal. The average value and the very low frequency components of the video signal obtained from the microbolometer detector after the processes of NUC and BPR are greatly influenced by the temperature of the detector's vacuum package and internal camera parts.

One set of solutions is the cryogenic cooled detectors arrays. Cooled detectors have the disadvantages of greater weight and complexity, as well as additional power consumption for cooling, shorter lifetimes and greater cost. Advantages of cooled detectors are that they can work at shorter wavelengths, say the 3 to 5 micron band and thus produce images having greater resolution. FLIRs based on the cooled devices have good sensitivity even for relatively high f numbers (f#) and have a very short time constant.

On the other hand, the uncooled thermal microbolometer array has other advantages. For example, uncooled devices have smaller physical size, lower weight and low power consumption.

The uncooled devices give video output immediately after power on, have a long MTBF (mean time between failures) relative to the cooled devices, and are generally cheaper.

Overall the cooled devices are used for long range applications and those in which the greater expense can be justified and the uncooled devices are used for medium and short range applications and those in which budgets are limited.

A second solution to the above described problem is proposed in U.S. Pat. No. 6,476,392 by Kaufman et al., which presents a temperature dependent focal plane array that operates without a temperature stabilization cooler and/or heater. Gain, offset, and/or bias correction tables are provided in a flash memory, in memory pages indexed by the measured temperature of the focal plane array. The gain, offset, and/or bias for each pixel are determined at each small temperature increment over the entire temperature operating range, for example by placing the array in a controlled oven and examining the array's response to a known temperature. The bias, gain, and offset data within the database are later read out, converted to analog form, and used by analog circuits to correct the focal plane array response. The data used for signal correction is determined only once, and then not under normal operating conditions. Kaufman et al. do not account for the variation in detector response over time, or due to other factors. Furthermore, Kaufman's patent deals with the detector response for the case that the detector does not have a fixed temperature stabilized working point. In such a case, temperature measuring requires a complete new data set for each small temperature increment. Such an approach is impractical.

An additional problem for imaging IR radiometers is that microbolometer detector arrays generally have a finite spatial response. Two black bodies that have the same temperature, but differ in size, or the same object at the same temperature but at different distances from the camera, produce different video signals at the detector output. A direct translation of the differential video signal into temperature is relatively accurate only for large objects. More specifically, the translation of the video signal into temperature is subject to an error introduced by the limited modulation transfer function (MTF) response for high spatial frequencies.

There are currently available a large number of uncooled microbolometer FLIR (forward looking infra-red) cameras, covering a large number of applications. These cameras contain regular uncooled microbolometer sensors that do not contain any radiometric shield. Typically, these cameras come with a standard lens of 35 mm or 50 mm focal length or other focal length optics. A problem is to find a way to upgrade these existing cameras in order to overcome the above-described drawbacks of the uncooled detector to allow them to give accurate temperature measurements under the restriction of very minor hardware modifications.

SUMMARY OF THE INVENTION

According to a first aspect of the present invention there is provided an infra-red imaging camera comprising:

an uncooled and unshielded detector arranged to detect infra red energy, and a calibrator to carry out periodic calibration operations by taking at least one calibration temperature measurement over said camera, said calibration temperature measurements being usable to correct energy detected at said uncooled sensor to discount energy not from an external scene, thereby to enable energy at said detector to be read as a temperature.

Preferably, said correcting comprises using a temperature obtained from said calibration temperature measurement as an initial offset to correct temperature measurements of said infra-red energy gathered from said external scene.

Preferably, said correcting is provided by combining a value from said initial measurement combined with a second value taken from a second calibration temperature measurement, said combining using a time-dependent function, to produce extrapolations of said corrections for later points in time after said calibration temperature measurements.

Preferably, said time-dependent function comprises a mathematical extrapolation function from most recent calibration temperature measurements.

The camera may be configured to make said correction using an initial offset which is a function of a temperature measurement of a shutter of said camera.

The camera may be configured to make said correction using an initial offset which is a function of a temperature measurement of a housing of said camera.

The camera may have a camera thermal time constant of a first duration, and a plurality of said calibration temperature measurements may be made during said first duration.

Preferably, said plurality is ten or less.

Preferably, a first thermistor is located on a shutter of said camera, a second thermistor is located on an external surface of detector's vacuum packaging of said camera and a third thermistor is located on a casing surrounding optics of said camera, and said calibration temperature measurement comprises taking readings from each of said thermistors.

Preferably, said shutter comprises a sheet.

Preferably, the sheet has an emissivity substantially approaching 1, within a spectral frequency range used by said detector.

Preferably, said uncooled sensor is configured to make said calibration temperature measurement by measuring radiation from said shutter.

Preferably, said shutter comprises a sheet having a reflectivity substantially approaching 1, within a spectral frequency range used by said detector.

Preferably, said uncooled sensor is configured to make said calibration temperature measurement by measuring radiation reflected from said shutter, said radiation being indicative of a temperature of said uncooled sensor.

Preferably, said shutter is mounted such as to have a first stable mechanical position obscuring focusing optics of said camera and a second stable mechanical position allowing free line of sight between said focusing optics and said detector.

Preferably, said uncooled detector comprises a microbolometer array.

Preferably, said detector is configured to obtain calibration temperature measurements from a video signal of an internal reference unit.

Preferably, temperature measurements at said uncooled sensor from said infra-red energy of said external scene are subject to an error introduced by a modulation transfer function of said camera for high spatial frequencies, said uncooled detector being equipped to overcome said error by incorporating an inverse of the modulation transfer function thereof.

The camera may be operable to make said calibration temperature measurement at an interval of time less than the camera thermal time constant.

Preferably, said detector comprises a microbolometer array, said camera being further configured to obtain said calibration temperature measurement at a same time as obtaining a non-uniformity correction matrix for said array.

The camera may be configured to use a same signal to temperature function for all pixels of said array.

Preferably, a shutter of said camera is used for measurements to enable bad pixel replacement of said array.

According to a second aspect of the present invention there is provided temperature correction apparatus, for correcting a response of a radiometer in accordance with a local camera temperature, said radiometer comprising:

an unshielded uncooled infra-red (IR) sensor, for providing an image response in order to form a temperature image in accordance with IR radiation impinging on said IR sensor's field of view (FOV), and a shutter, for controllably obscuring said FOV, an internal face of said shutter forming a measurement surface for an internal temperature reference unit;

said temperature corrector comprising:

a temperature sensor for determining a reference temperature using said measurement surface, a reference, for using a local camera reference response and said reference temperature to approximate a temporal effect of temperature drift of said local temperature; and a signal corrector associated with said temperature sensor and said reference, said signal corrector being configured to produce a correction to said image in accordance with said approximated temporal effect.

Preferably, said reference temperature and said reference response are determined during the obscuration of said FOV by said shutter.

Preferably, said IR sensor comprises a microbolometer.

Preferably, said IR sensor comprises an array of microbolometers.

Preferably, said approximation is a mathematical functional approximation based on previous measured data.

Preferably, said approximation is an extrapolation of two or more successive temperature measurements.

Preferably, said IR sensor array is operable to provide a two-dimensional image.

Preferably, said signal corrector is further operable to perform non-uniformity correction (NUC) using said measurement surface.

The apparatus may comprise an array having a plurality of pixels, said array being configured to use a same signal to temperature function at each pixel of said array to obtain temperatures.

Preferably, said signal corrector is further operable to perform bad pixel replacement (BPR) using said measurement surface.

Preferably, said measurement surface is substantially black body for an IR spectral frequency range of interest.

Preferably, said temperature sensor is configured in relation to said measurement surface to measure a temperature thereof.

Preferably, said temperature sensor is operable to measure the radiation emitted by said measurement surface.

Preferably, said measurement surface is substantially a reflective surface for an IR frequency range of interest.

Preferably, said temperature sensor is configured in relation to said measurement surface to measure a temperature thereof, said temperature being a temperature of said apparatus.

Preferably, said signal corrector is operable to calculate a difference between a sub-sensor level and a respective reference level, and to add said reference temperature to said difference.

The temperature corrector may be configured to produce said corrected image using numerical processing.

The corrector may further comprise a shutter controller for controlling a position of said shutter between an obscuring position and an exposing position.

The corrector may comprise a filter for compensating camera modulation transfer (MTF) effects from said corrected image.

According to a third aspect of the present invention there is provided a method for correcting a response of a radiometer in accordance with a local temperature, said radiometer comprising an infra-red (IR) sensor, for providing an image response in order to form a temperature image in accordance with IR radiation impinging on said IR sensor's field of view (FOV), and a shutter, for controllably obscuring said FOV, said method comprising:

determining, while said FOV is obscured by said shutter, a reference temperature of a location selected in accordance with an emissivity of said shutter; and producing a correction to said image in accordance with said reference temperature.

The method may comprise determining a dependent reference response of said radiation sensor to said reference temperature; and using said reference response in modifying said correction in between determinations of said reference temperature.

Preferably, said IR sensor comprises a microbolometer array.

The method may comprise performing non-uniformity correction (NUC).

The method may comprise using a same signal to temperature function at each pixel of said array to obtain a temperature.

The method may comprise performing bad pixel replacement (BPR).

Preferably, said shutter comprises an internal surface which is substantially a blackbody at an IR spectral frequency range of interest, and said determining of said reference temperature comprises measuring a temperature of said surface.

Preferably, said shutter comprises an internal surface which is substantially fully reflective at an IR spectral frequency range of interest, and said determining of said reference temperature comprises measuring a temperature at said surface, said temperature being representative of said IR sensor.

The method may comprise filtering said corrected image response to compensate camera MTF effects.

According to a fifth aspect of the present invention there is provided an infra-red camera comprising:

focusing optics for gathering infra-red energy from an external scene, an uncooled infra-red sensor arranged to detect said infra red energy from said focusing optics, and a high pass filter, wherein temperature measurements at said infra-red sensor from said infra-red energy of said external scene are subject to an error introduced by a camera modulation transfer function for high spatial frequencies, said high pass filter being configured to overcome said error by incorporating an inverse of the modulation transfer function of the camera.

Preferably, said infra-red sensor is an uncooled infra-red sensor.

Preferably, said infra-red sensor is an uncooled microbolometer array.

According to a sixth aspect of the present invention there is provided a method of upgrading an infra-red imaging camera for making temperature measurements, the existing infra-red camera comprising:

focusing optics for gathering infra-red energy from an external scene, an uncooled detector unshielded from internal parts of said camera and arranged to detect infra red energy, and a shutter, controllably mounted to periodically interpose itself between said focusing optics and said uncooled sensor array to allow said detector to carry out periodic uniformity correction operations from temperature measurements over said shutter surface, the upgrade comprising applying at least one temperature sensor within said camera for allowing a localized temperature measurement to be taken at periodic intervals for use in calibrating a received image.

Preferably, applying said at least one temperature sensor comprises fixing a temperature sensor to said shutter.

Preferably, applying said at least one temperature sensor comprises fixing a first temperature sensor to said shutter, and an additional sensor to a detector housing of said camera.

Preferably, said applying said at least one temperature sensor comprises configuring said at least one sensor to measure said local temperature when said shutter interposes between said focusing optics and said sensor.

Preferably, temperature measurements at said infra-red detector from said infra-red energy of said external scene are subject to an error introduced by a camera modulation transfer function for high spatial frequencies, said upgrade further comprising providing a high pass filter in association with said camera, said high pass filter being configured to overcome said error by incorporating an inverse of said camera modulation transfer function.

According to a seventh aspect of the present invention there is provided a method of upgrading an existing infra-red imaging camera to measure temperatures of objects in a field of view, the existing infra-red detector comprising:

focusing optics for gathering infra-red energy from an external scene, and an uncooled unshielded detector arranged to detect infra red energy, wherein temperature measurements at said infrared detector from infra-red energy of said external scene are subject to an error introduced by a camera modulation transfer function for high spatial frequencies, the upgrade comprising providing a high pass filter in association with said optics, detector and signal processing, said high pass filter being configured to overcome said error by incorporating an inverse of the modulation transfer function of said camera.

Preferably, said high pass filter is any one of a group comprising hardware, firmware, software, or a combination thereof.

The method may comprise arranging said high pass filter to compensate an error introduced by the signal processing performed by said infra-red imaging camera.

According to an eighth aspect of the present invention there is provided an infra-red imaging camera having a microbolometer detector array, the camera comprising a variation compensation mechanism to form a non-uniformity correction matrix to overcome variation between pixels of said array, and being configured to use a same transfer function for converting received signal to temperature for said pixels of said array.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 15a and 15b are graphs which show a third order polynomial approximation;

DESCRIPTION OF THE PREFERRED EMBODIMENTS

Figure 1:
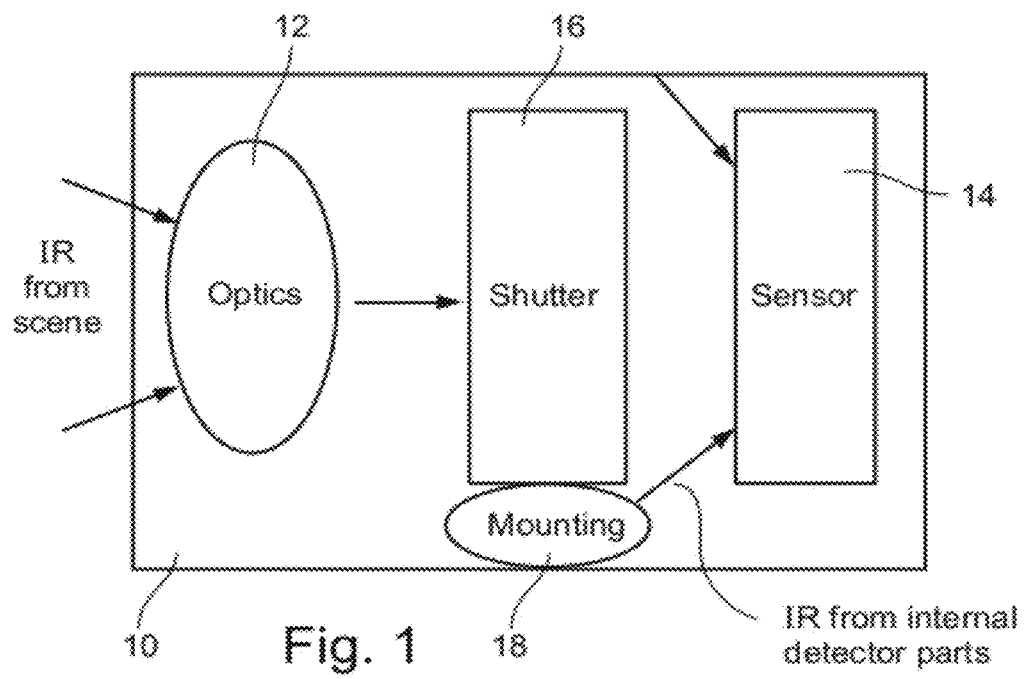
FIG. 1 is a simplified diagram showing a simplified block diagram of an infra-red detector according to a first preferred embodiment of the present invention.

The present embodiments are of a infra-red camera such as a FUR camera with a detector or detection mechanism that uses an uncooled microbolometer array, has standard optics and does not include any radiation shield. The embodiments allow such a camera to be used for temperature measurement. The embodiments discount internal temperature and temperature effects by approximating a temperature change response function of the camera. Regular optics means optics that do not reimage the input optics aperture on the radiation shield. To date such an arrangement does not exist for regular detectors.

A general description of the design considerations, temperature drift model and the expected accuracy is presented. The embodiments enable temperature measurement at a relatively high accuracy for an uncooled microbolometer based FLIR, even if the detector is not a radiometric one, by using the NUC flag as an extremely low frequency chopper.

The principles and operation of an infra-red detector and associated temperature correction mechanism according to the present embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram illustrating an infra-red detector 14 (10 is the entire seeker including the optics the shutter and the detector). Seeker 10 comprises focusing optics 12 for gathering infrared energy from an external scene. Typically the focusing optics comprises one or more lenses, one of which is controllably mounted to alter the focal length. The focusing optics are preferably optimized for the operating spectral frequency range of the application and detector and for the spatial resolution required.

Located behind the optics 12 is an uncooled IR sensor 14 which is arranged to detect infra red energy from the focusing optics 12. There is no radiation shield around the sensor and therefore the IR radiation that impinges on the sensor is not only IR information from the scene arriving via the focusing optics but also includes energy from surrounding parts of the camera as well. Furthermore, as the surrounding parts of the camera are considerably closer than the IR sources in the scene, and the camera is uncooled, the energy exchanged between the detector and the camera internal parts is much larger than the signal from the scene. As mentioned in the background the energy exchanged between the detector and the camera internal parts including the optics tends to overwhelm the signal collected from the scenery in an uncooled detector by around ten to one.

In between the optics and the sensor is an internal temperature reference unit 16. The reference unit comprises a shutter which is controllably mounted to periodically interpose itself between the focusing optics 12 and the uncooled sensor 14. Mounting 18 allows the shutter to move between a position in which it interposes between the optics and the sensor and a second position in which it does not interpose, and control is provided, typically via a computer controlled actuator so that the shutter can move between the two positions with a frequency which is high enough not to obscure the view. More particularly, the shutter is moves sufficiently fast so as not to obscure the view for any significant time period. Furthermore the shutter stays in the closed position for a period of time that enables collection of at least a few frames. The period of time between one shutter image obscuring and the next one is usually set to a few minutes. This period of time has to be, and indeed is, much shorter than the camera thermal time constant. The camera itself is sealed, and thus has a relatively long thermal time constant for temperature change, typically of the order of half an hour. The shutter can therefore take temperature measurements say once every few minutes and then make a calibration to cover the time until the next measurement can be carried out, by making a mathematical extrapolation from the current and previous measurements. That is to say the internal camera parts have a temperature, and that temperature fluctuates. Even in the case of the largest likely temperature fluctuations in the environment of the camera, the temperature changes within the camera are limited by a certain time constant so that as long as temperature measurements are made more frequently than this time constant the measurements remain valid.

The mechanism allows the detector to carry out periodic calibration operations by taking a calibration temperature measurement over the temperature reference unit and at other points on the camera such as the detector and the internal body of the camera. That is to say the temperature of the shutter and other points is measured and used as input to a function to provide a time dependent offset which can then be applied to the detector signal to discount the influence of internal camera parts. Thus the modified detection signal can provide an accurate temperature measurement of an object being imaged. The mechanism and the ability to extrapolate typically ensures that the internal temperature reference unit needs to be in a position of periodic interposition relatively infrequently.

Figure 2:
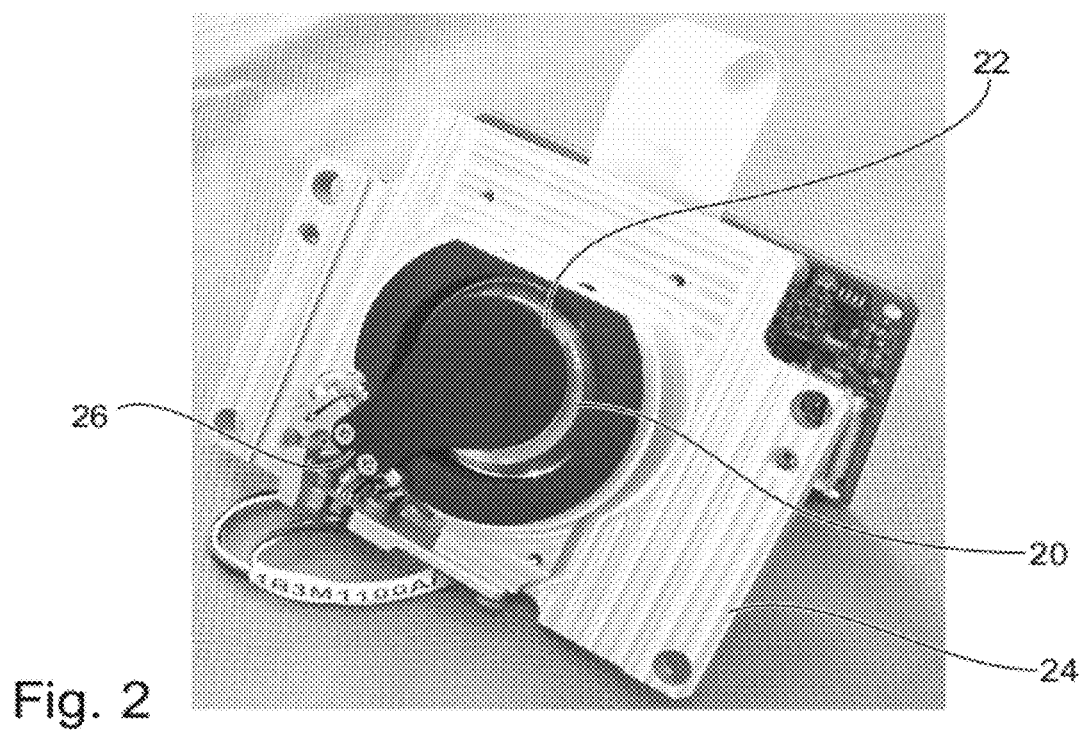
FIG. 2 illustrates an uncooled microbolometer based sensor with a shutter in the obscuring position, according to a preferred embodiment of the present invention.
Figure 3:
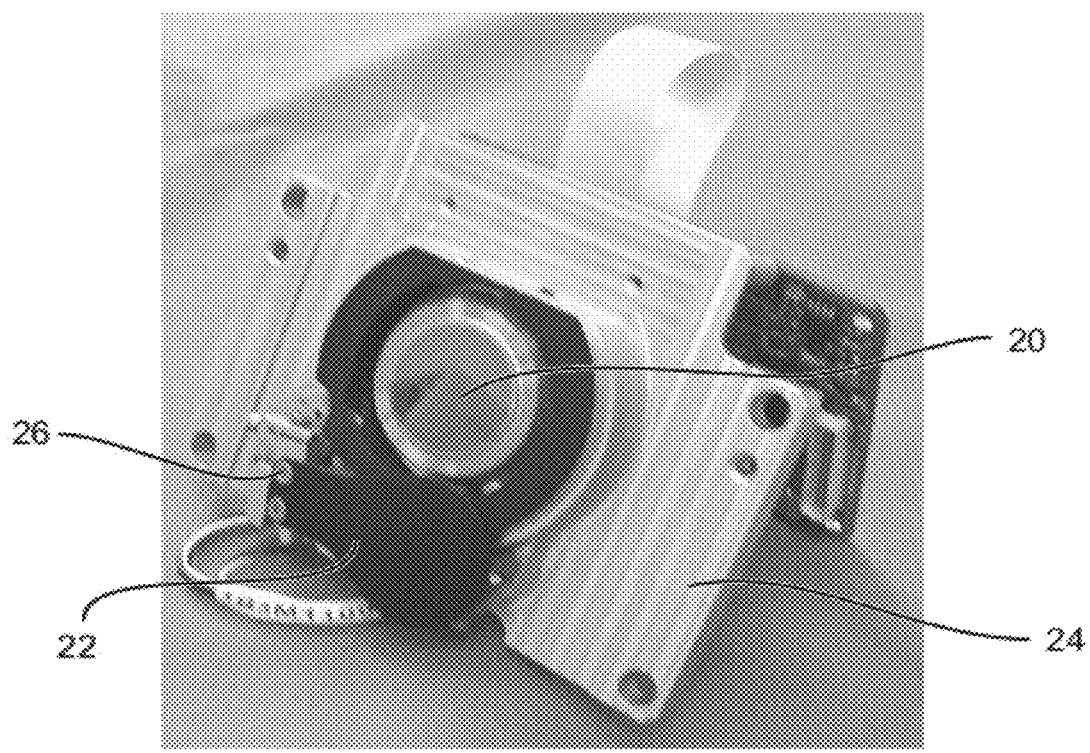
FIG. 3 illustrates the sensor of FIG. 2 in which the shutter is out of the way, exposing the sensor.

Reference is now made to FIGS. 2 and 3 which show uncooled microbolometer based sensors 20 with shutters 22. The optics are removed for simplicity. In FIG. 2 the shutter is in position to interpose between the optics and the sensor and in FIG. 3 the shutter is out of the way, exposing the sensor. The shutters and sensors are mounted within housing 24, and shutter 22 is attached to the housing via controllable mounting 26.

The internal reference unit is made up of a shutter and the shutter is typically a flat sheet. The sheet may be metallic or made of any other suitable material. The sheet is sized such that when interposed between the focusing optics and the uncooled sensor array, it substantially obscures the external scene from the sensor but does not necessarily obscure internal structures of the detector. A typical size in relation to the rest of the detector is as shown in above referenced FIGS. 2 and 3.

In one exemplary embodiment the internal surface of the shutter has an emissivity which is as close as possible to 1 over the spectral frequency range used by the detector. That is to say it is provided with a surface coating to give it black body properties over the given spectral frequency range in which the microbolometer detector exchanges radiation energy.

In such an embodiment the uncooled sensor itself may be configured to make the calibration temperature measurement by measuring radiation from the black body surface of the shutter. That is to say the sensor simply images the shutter as it would a scene and converts the received image into a temperature. As the shutter is a black body thus having substantially no reflection, the temperature measured externally through radiation is the temperature of the shutter itself and not of surrounding features. The sensor is thus configured to obtain temperature measurements from a video signal of the internal reference unit.

Figure 4:
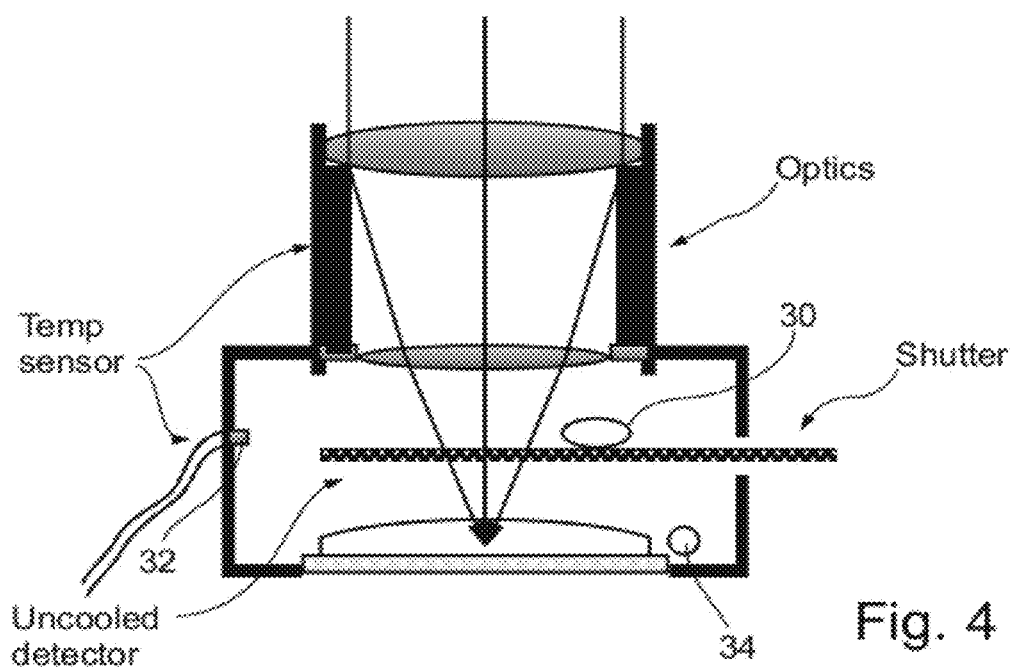
FIG. 4 is a simplified diagram showing a variation of the embodiment of FIG. 1, in which a temperature sensor is placed on the shutter and at other locations within the detector.

Reference is now made to FIG. 4, which is a simplified diagram showing a variation of the embodiment of FIG. 1, in which a temperature sensor 30 is placed on the shutter.

The temperature sensor makes a contact type temperature measurement. For a black body the internal temperature and its radiation temperature are the same, so that in this case, a contact type measurement of the black body indicates the shutter's temperature. An additional temperature sensor 32 may be placed on the housing.

In an alternative embodiment the shutter has a reflectivity as close as possible to 1, within a spectral frequency range used by the detector. That is to say the internal surface of the shutter is a mirror. Again, the uncooled sensor is configured to make the calibration temperature measurement by measuring radiation from the internal reference unit. In this case, the radiation, being reflected, indicates the temperature of the uncooled sensor itself. In the case of a reflecting shutter the reference temperature is the temperature at which the microbolometer is stabilized. If the microbolometer detector is stabilized at 30 degrees Celsius for example the reference temperature is fixed and equal to 30 degrees Celsius.

Figure 5:
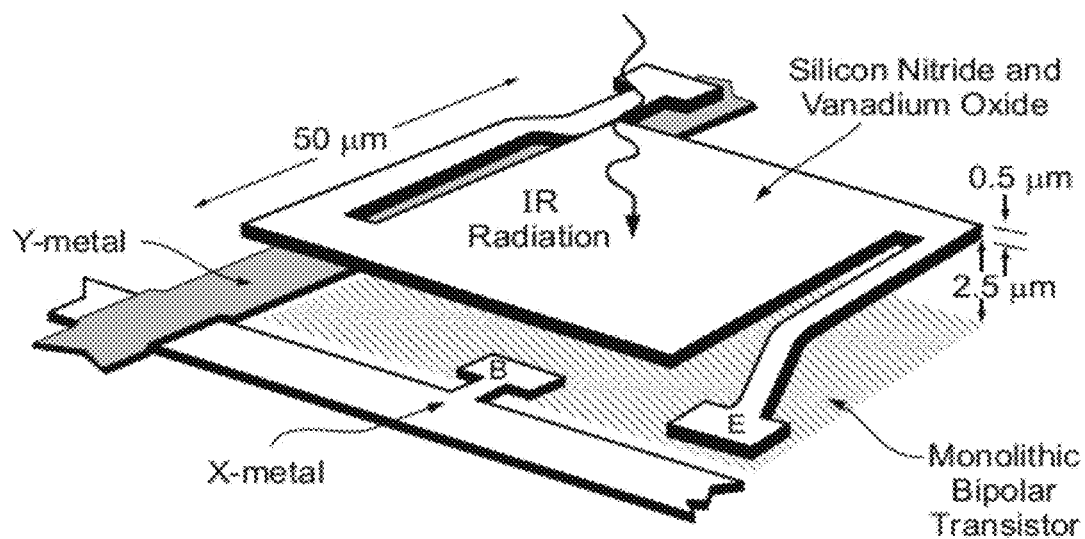
FIG. 5 is a simplified diagram showing a microbolometer.

Reference is now made to FIG. 5, which is a simplified diagram showing a microbolometer 40. Microbolometers are widely used as IR sensors and can be made small and packed into arrays so that each microbolometer is a pixel on an array type image sensor. The structure and workings of the microbolometer are well-known to the skilled person.

Figure 6:
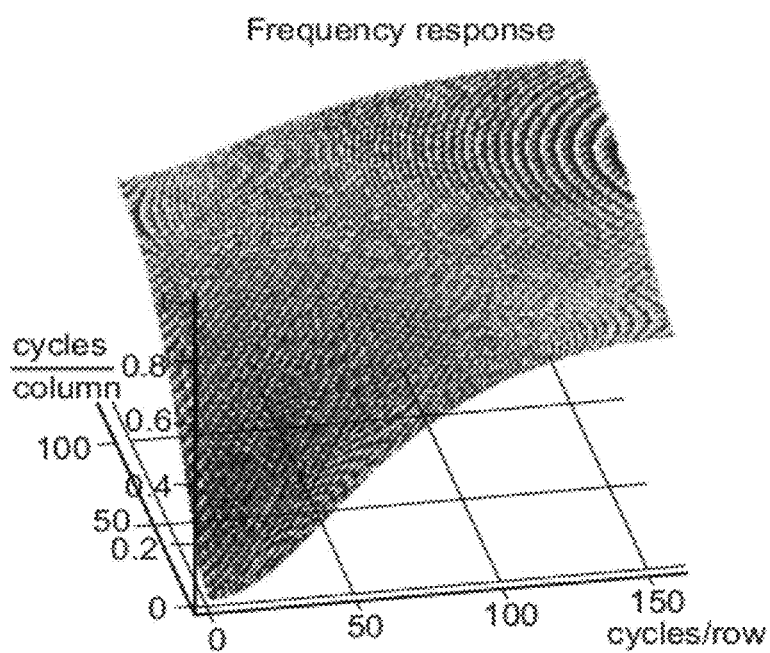
FIG. 6 illustrates an example for FLIR inverse modulation transfer function (MTF$^{-1}$) for a 320 by 240 element array.

The temperature measurements made at the uncooled sensor are subject to an error introduced by the camera's modulation transfer function. In an exemplary embodiment of the present invention the uncooled sensor is equipped to overcome the error by incorporating an inverse of the modulation transfer function of the respective FLIR camera. FIG. 6 illustrates such an inverse function for a 320 by 240 element array. The function is implemented as a high pass filter.

At the same time as the local temperature is being determined, the shutter is used to update the non-uniformity correction matrix for the uncooled sensor. That is to say, since the shutter is not in focus, all pixels imaging the shutter should obtain the same measurement. Thus any variation between the pixels, after the non uniformity correction process, is due to the new temperature distribution on the internal surfaces of the vacuum package because the primary non uniformity response of the different detector's elements is corrected by a different and much more complex correction process. A matrix of variations between the pixels may be built up and subsequently used to correct the received image.

During the same period of time that the reference pictures are acquired for the NUC updating process, the reference temperature is measured and associated with the average video signal named $AS_n$. The video signal after NUC and BPR is used for the average calculation.

Subsequently, when the shutter is in the non-obscuring position, the temperature at any point in the detector's field of view can be calculated from $$T_{i,j}=F(p_{i,j}-AS_n,E_{i,j},\text{temp\_amb},\text{etc})+\text{Reference\_temperature}$$

in which:

Reference_temperature represents the reference temperature defined hereinabove;

$T_{i,j}$ represents the temperature value associated with each one of the $p_{i,j}$ video signal element values;

$p_{i,j}$ represents either the video signal of element i,j after non uniformity correction and bad pixel replacement, or $p_{i,j}$ represents the video signal of element i,j after non uniformity correction, bad pixels replacement and MTF inverse filter;

$E_{i,j}$ represents the emissivity of the surface seen by the detector at location i,j; temp_amb represents the ambient temperature of the viewed scenery; and $F(\ldots)$ represents a general function that translates the detector video signal into temperature using different input variables such as the video signal, the average video signal measured during the NUC updating process, the emissivity, the ambient temperature etc.

The same measuring process involving the sensor and the internal reference unit comprises imaging the shutter to enable bad pixel replacement. Thus any pixel determined by the imaging process not to be working can be discounted and its signal be replaced, for example by an average of the surrounding pixels.

In the following, a relatively detailed model for the energy exchanged between the microbolometer detector and the view, the optics, and the internal camera parts is given. A mathematical model that describes the detector signal versus target temperature is derived, that results in a polynomial model for temperature measurement. The solution implemented for reducing the measured temperature drift, as outlined above, is also discussed and an accuracy obtained.

Energy Exchanged Model

The video signal at the microbolometer output is generated by the energy exchanged between the detector's elements and:

The view
The optics
The internal camera parts.

The signal itself is built up as a transient process. Assuming that the readout process is interrupted, the energy exchange takes place until a steady state situation is achieved. The energy exchange process time constant is equal to the ratio between the suspended structure Thermal Capacity and Thermal Conductance.

$$\tau = \frac{\text{Thermal\_Capacity}}{\text{Thermal\_Conductance}} \ [\text{sec}]$$

Assuming an unlimited time interval and assuming that the view can be modeled as a Blackbody radiation source (emissivity=1) the energy exchanged between the detector and the view is expressed by the following formula:

Energy in joules, exchanged between the detector and the view.

Equation 1

$$P\_view(\Delta Temp) = \frac{\pi \cdot A\_det}{4(f\#)^2}$$

$$\int_0^\infty \int_{\lambda\_1}^{\lambda\_2} (L(\lambda, Temp_0 + \Delta Temp) - L(\lambda, Temp_0)) \cdot \text{Trans\_optics}$$

$$(\lambda) \cdot \varepsilon(\lambda) \cdot \exp\left(-\frac{t}{\tau}\right) dt \cdot d\lambda$$

P_view represents the energy [in joules] exchanged between one detector element and the scenery;

$L(\lambda, Temp_0+\Delta Temp)$ represents the view, modeled as an average Blackbody radiation source in Watts/(sr·m$^3$);

$Temp_0$ represents the detector's suspended structure temperature in degrees Kelvin;

A_det represents the effective area of a single detector's element in $m^2$;

f# represents the f number of the optics;

λ represents the wavelength in meters;

λ_1 represents the lower integral limit;

λ_2 represents the upper integral limit;

Trans_optics(λ) represents the transmittance of the optics;

ε(λ) represents the emissivity of detector's suspended structure; and t presents the time in seconds.

Solving Equation 1 for the time variable, the energy exchanged between one detector's element and the view is described by the following expression:

Energy in joules, exchanged between the detector and the view.

Equation 2

$$P\_view(\Delta Temp) = \frac{\pi \cdot A\_det \cdot \tau}{4(f\#)^2} \cdot$$
$$\int_{\lambda\_1}^{\lambda\_2} (L(\lambda, Temp_0 + \Delta Temp) - L(\lambda, Temp_0)) \cdot Trans\_optics(\lambda)\varepsilon(\lambda) \cdot d\lambda$$

Figure 7:
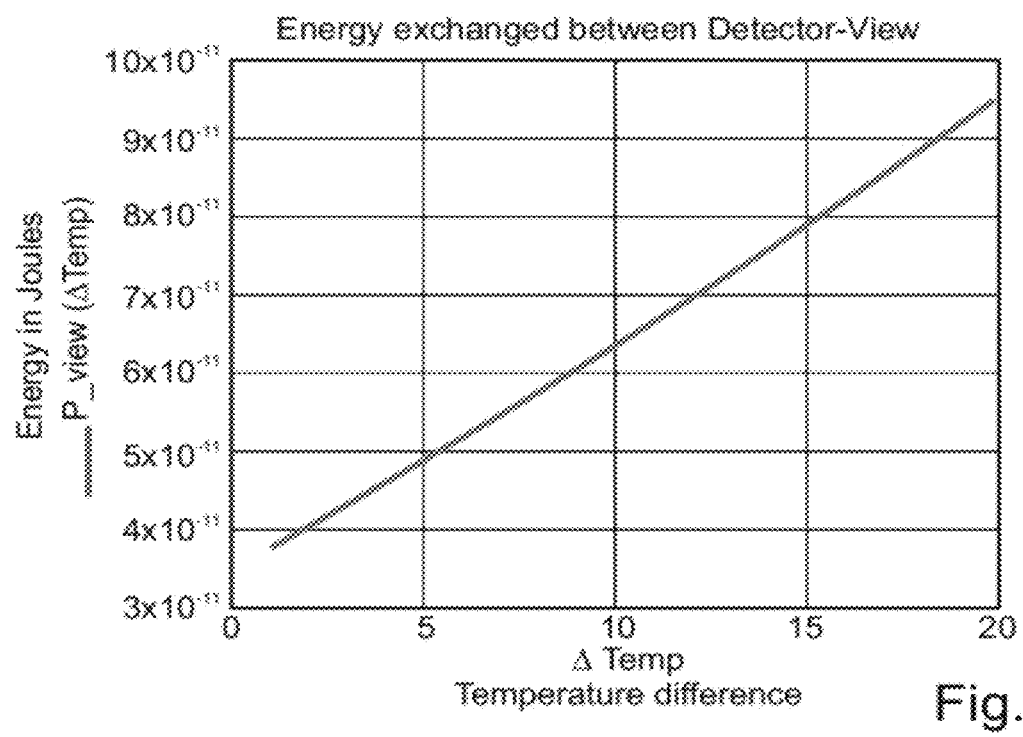
FIG. 7 is a graph illustrating the energy exchanged between the sensor and the external view assuming that the optics f# equals 1.

FIG. 7 describes the energy exchanged between the detector and the view assuming:

f number equals 1 high transmittance optics (93%)

detector emissivity equals 0.8 effective detector area equaling $(41*10^{-6})^2$ meters a spectral band ranging from $8*10^{-6}$ to $12.5*10^{-6}$ meters The energy P_optics(ΔTemp) exchanged between the detector and optics assuming similar conditions to those described hereinabove is given by the following mathematical expression:

Energy in Joules, exchanged between the detector and optics.

$$P\_optics(\Delta Temp) = \pi\tau \cdot A\_det \cdot$$  Equation 3
$$(\sin(\theta))^2 \int_{\lambda\_1}^{\lambda\_2} (L(\lambda, Temp_0 + \Delta Temp) - L(\lambda, Temp_0))$$
$$(1 - Trans\_optics(\lambda))\varepsilon(\lambda) d\lambda$$

Figure 8:
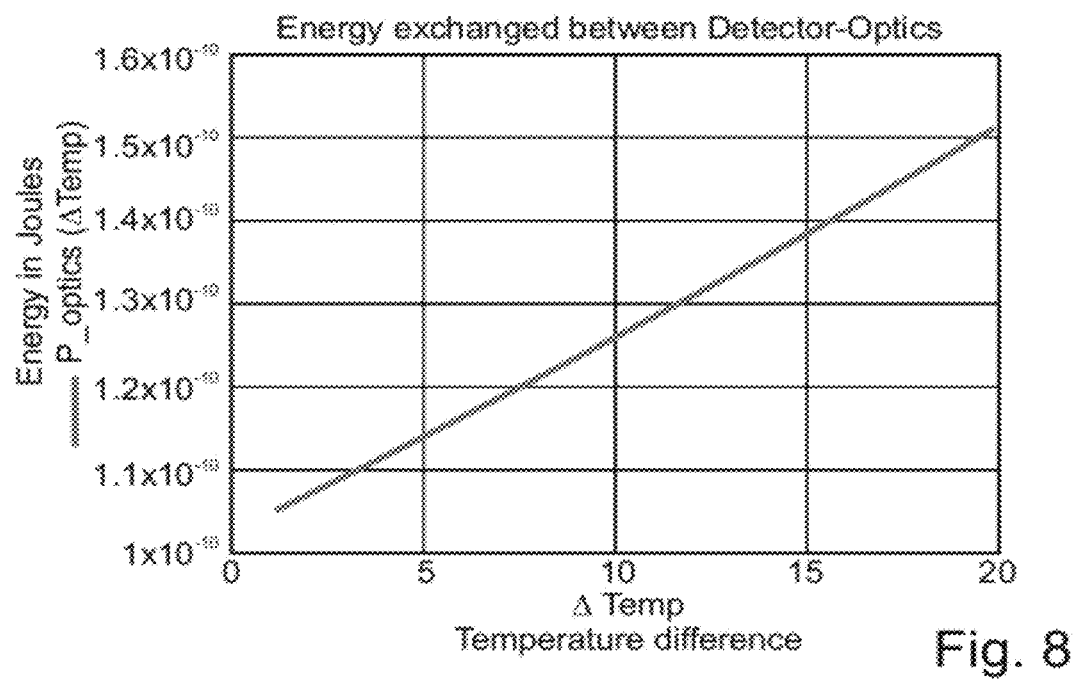
FIG. 8 is a similar graph illustrating the energy exchanged between the sensor and the optics.

FIG. 7 is a graph illustrating the energy exchanged between the sensor and the external view, and FIG. 8 is a similar graph illustrating the energy exchanged between the sensor and the optics.

$L(\lambda, Temp_0 + \Delta Temp)$ represents the optics, modeled as an average Blackbody radiation source in Watts/(sr·m³) and emissivity equals (1−Trans_optics(λ)).

$$\theta = arc\_tan\left(\frac{1}{2 \cdot f\#}\right)$$

θ represents half of the planar cone angle related to the light collection.

θ=0.464 radian for f#=1.

Figure 9:
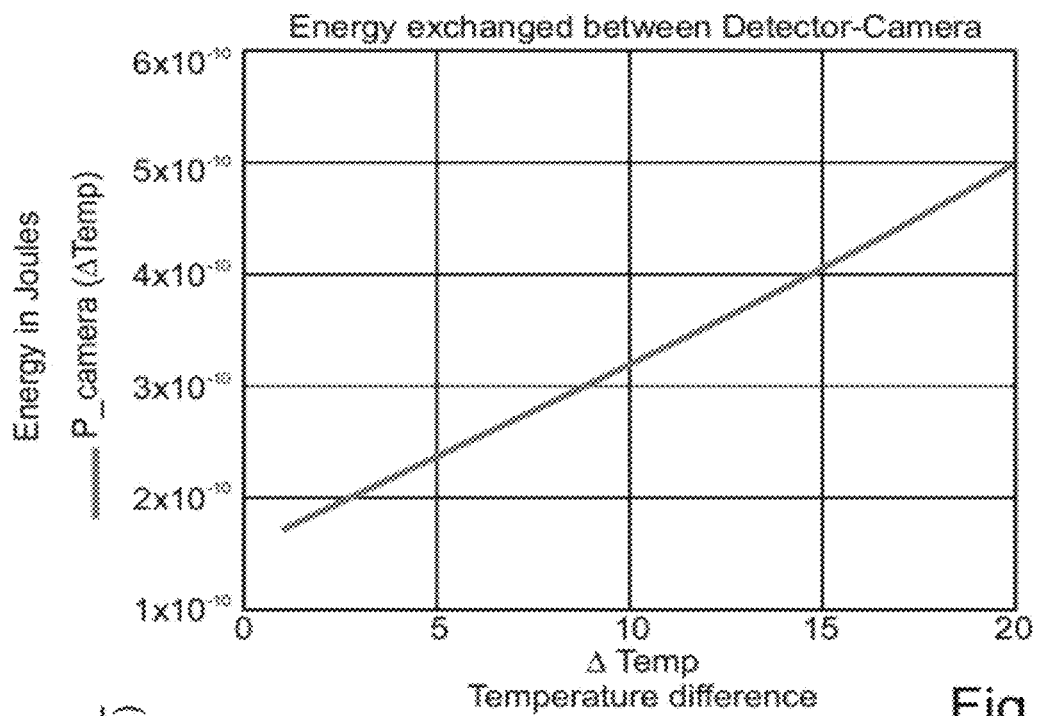
FIG. 9 is a simplified diagram illustrating the exchange of energy between the camera and the internal camera parts.

FIG. 9 is a simplified diagram illustrating the exchange of energy between the camera and the internal camera parts. The energy P_camera(ΔTemp) exchanged between the detector and the internal camera parts assuming similar conditions to those described hereinabove, is given by the following mathematical expression:

$$P\_camera(\Delta Temp) = \pi\tau \cdot A\_det \cdot (1 - (\sin(\theta))^2)$$
$$\int_{\lambda\_1}^{\lambda\_2} (L(\lambda, Temp_0 + \Delta Temp) - L(\lambda, Temp_0)) \cdot \varepsilon(\lambda) d\lambda$$

$L(\lambda, Temp_0 + \Delta Temp)$ represents the internal camera parts, modeled as an average Blackbody radiation source in Watts/(sr·m³) and emissivity equals one.

The energy exchanged between the detector and internal camera parts is the largest factor, followed by the energy exchanged between the detector and the optics. The energy exchanged between the detector and the view is the smallest factor.

Figure 10:
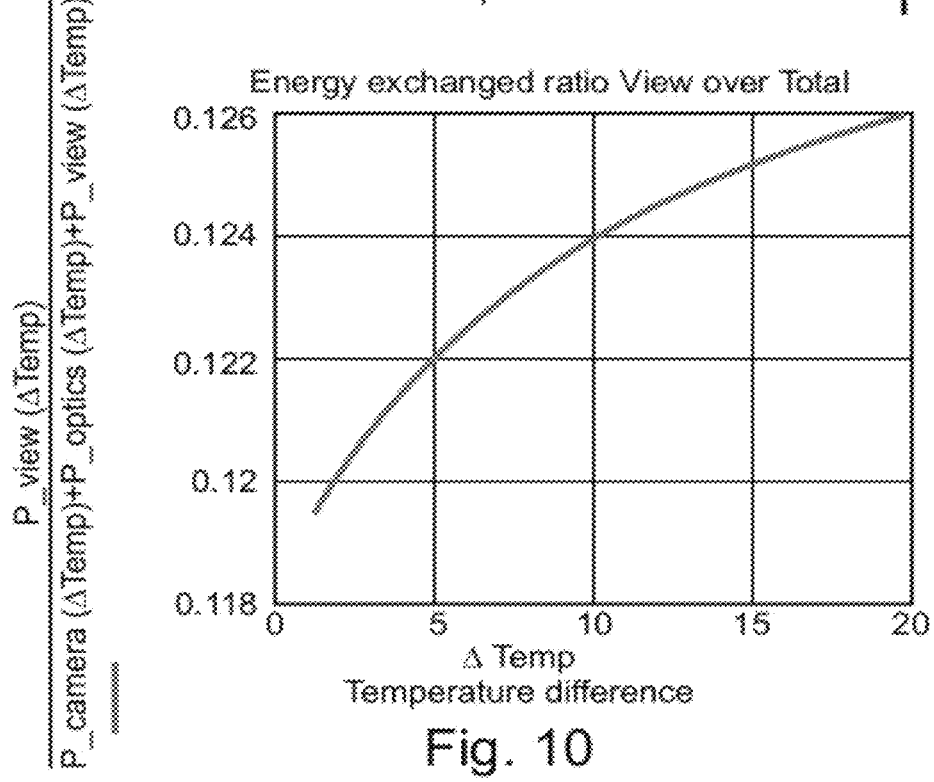
FIG. 10 is a graph illustrating view energy as a proportion of the total energy.

Assuming, simultaneously, the same temperature difference between the detector and the view, detector and optics and detector against camera internal parts, the amount of energy exchanged between the detector and the view is about 10%. The situation is illustrated in FIG. 10 which is a graph illustrating view energy as a proportion of the total energy.

Analysis of the results obtained shows that the ability to reconstruct the view temperature from the video signal collected is very difficult, since the view energy is such a small proportion thereof. The energy exchanged by the detector with the internal camera parts depends on temperature distribution of the internal camera parts. This distribution is not constant, due to the fact that the camera's thermal time constant is very long (about half an hour) and usually the environmental conditions are not stable for such long periods of time. A dynamic model based on the temperature distribution of internal camera parts is too complicated and beyond the capability to be implemented in the existing hardware. Therefore in the presently preferred embodiments the non-uniformity correction (NUC) update process is used in order to eliminate the influence of internal camera parts. The flag (or shutter) inserted in front of the detector during the NUC update process is used as an extremely low-frequency chopper. The flag's surface facing the detector may in one embodiment be treated and coated in order to behave as close as possible to an ideal Blackbody surface. Referring again to the embodiment of FIG. 5, a few very accurate thermistors (±0.025° C.) may then be installed at the following locations:

One thermistor 30 on the rear of the flag or shutter surface,

One thermistor 34 on the external surface of the detector's vacuum package

Two thermistors (only one shown) 32 are glued to the external optics metal case.

Temperature Measurement Description

Let us assume, just for simplicity, that the influence of the optics is negligible.

(Later on we review this assumption). Since the NUC update process is periodically performed, we may assume that during Process #n, the average detector signal $As_n$—after NUC update and bad pixel replacement (BPR) have been performed—has been calculated. We also assume that during the same NUC updating Process number n, the temperatures of all the installed thermistors have been acquired.

$Tf_n$ represents the temperature measured on the flag during the n NUC update process, $Td_n$ represents the temperature measured on the external surface of the detector's vacuum package during the number n NUC update process, To$_n$ represents the average temperature measured on the external optics case during the number n NUC update process.

Let us assume that the average temperature of some arbitrary, relatively large area of interest (the MTF problem will be mentioned later on) has to be measured. Let us further assume that the specified area belongs to an ideal Blackbody radiation source.

The first approximation of the measured temperature is expressed by Taylor series:

$$T\_meas = T\_meas(As) + \frac{dT\_mes(As)}{dAs}(Sig - As) +$$
$$\frac{1}{2!}\frac{d^2T\_mes(As)}{dAs^2}(Sig - As)^2 + \frac{1}{3!}\frac{d^3T\_mes(As)}{dAs^3}(Sig - As)^3$$

where: T_mes represents the first approximation of the measured temperature.

Sig represents the average video signal after NUC and BPR of the area of interest mentioned above, at some point in time between the n and n+1 NUC update processes.

We define As to be the average detector signal value measured on the flag during the number n NUC updating process. Therefore by definition:

First approximation of the measured temperature.

$$T\_mes(As_n) = Tf_n$$
$$T\_mes = F(Sig - As_n) + Tf_n \quad \text{Equation 4}$$
$$F(Sig - As_n) = \sum_{i=0}^{\infty} a_i \cdot (Sig - As_n)^i$$

where:
F represents the transform that translates the video signal to temperature.

Figure 11:
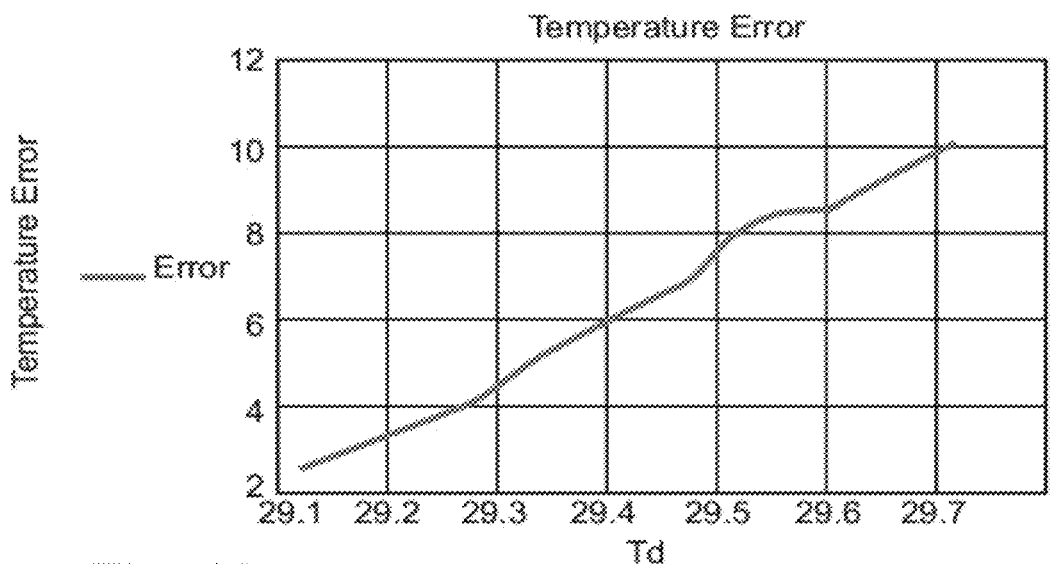
FIG. 11 is a plot of temperature error versus vacuum package thermistor (temperature measurement sensor) temperature.
Figure 12:
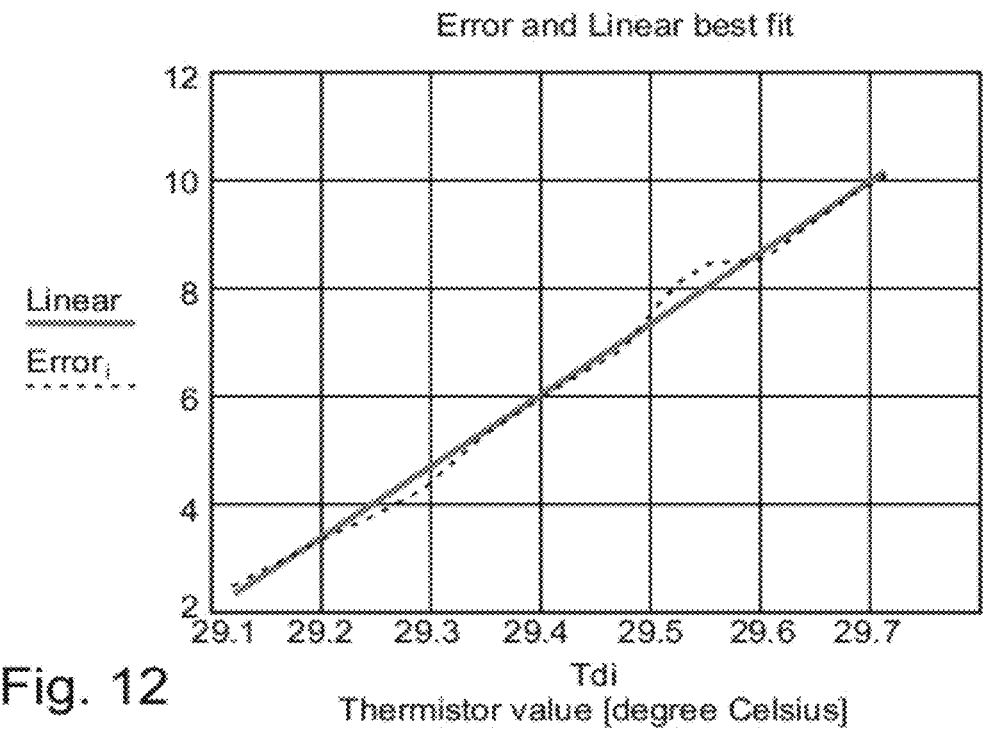
FIG. 12 is a graph, which describes the minimum mean square error linear fit to the Error value.

Equation 4 presents the general idea of using any chopper as a reference source. The chopper's video signal is subtracted from the video signal to be measured. In this way a differential measurement is performed. The video value Sig−As$_n$ is translated to temperature and the offset value Tf$_n$ is finally added. This general approach works very well in the case that As$_n$ and Tf$_n$ are almost constant between successive samples. However, as explained above this is not the case. The Error between the real object temperature and the reconstructed one by the first approximation formula, was plotted versus the temperature measured on the external surface of detector's vacuum package (Td) during a period of more than 10 minutes. The results are shown in FIG. 11, which is a plot of temperature error versus vacuum package thermistor temperature. The plot described in FIG. 11 shows typical behavior. FIG. 12 describes the minimum mean square error linear fit to the Error value. However, the slope of the linear best fit is not constant in time. A high slope value means that the camera is far from thermal steady state situation and a very low slope means that the camera is in thermal equilibrium.

Each time the NUC update procedure is performed, the error of the measured temperature T_mes caused by the internal camera temperature fluctuations is eliminated. The typical behavior described in FIG. 11 and FIG. 12 suggests that by adding an additional term to the first approximation (Equation 4) a better solution can be obtained.

$$T\_mes = F(Sig - As_n) + Tf_n + \frac{\Delta T\_mes_n}{\Delta Td_n}(Td - Td_n) \quad \text{Equation 5}$$

where Td$_n$ represents the temperature measured on the external surface of the detector's surrounding vacuum package during the n NUC update process.

The general idea expressed in Equation 5 cannot be directly implemented. An approximation of this idea was implemented using the values As$_n$, Tf$_n$ and Td$_n$, producing Equation 6:

Second Approximation $$T\_mes = F(Sig - As_n) + \frac{F(As_n) - (As_{n-1}) - (Tf_n - Tf_{n-1})}{Td_n - Td_{n-1}}(Td - Td_n) + Tf_n. \quad \text{Equation 6}$$

The expression F(As$_n$−As$_{n-1}$) estimates the total flag change in temperature measured by the detector. However this value contains the error caused by the internal camera parts change in temperature and the real change in the flag's temperature.

Figure 13:
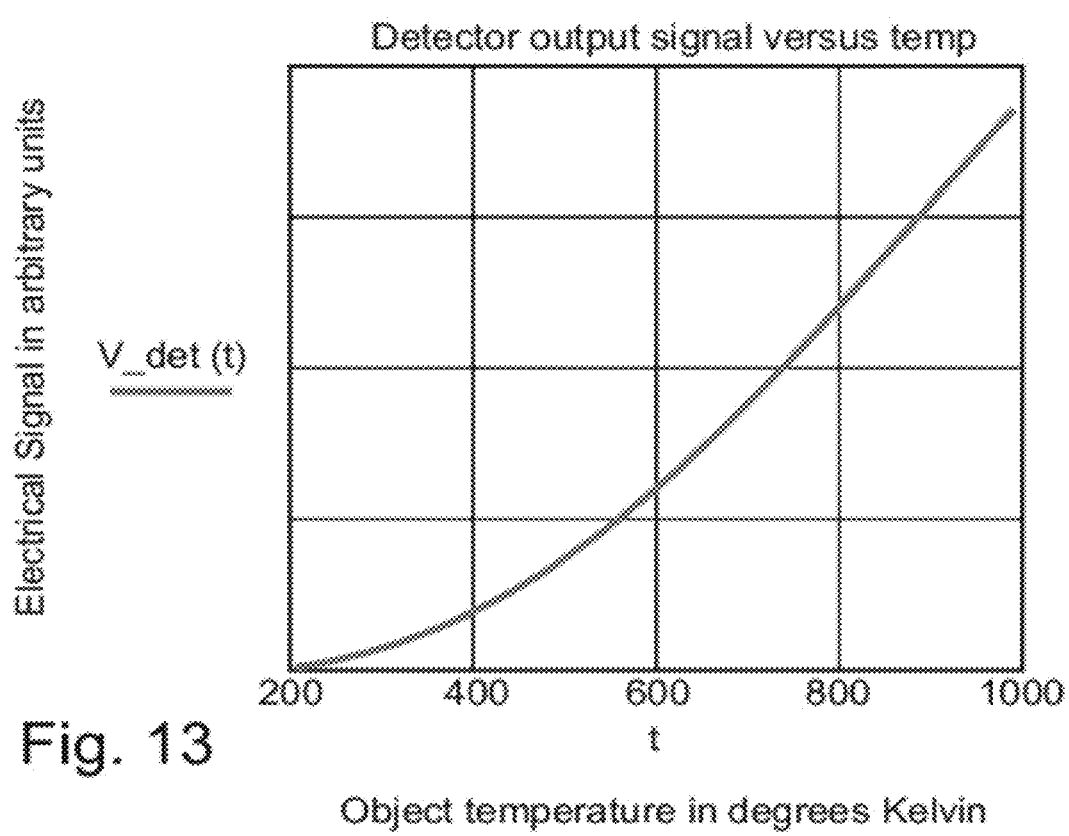
FIG. 13 is a graph of detector output signal against temperature, and describes the output of the mathematical model.

We now deal with F function approximation. A mathematical model that describes the detector's signal after NUC and BPR processes, was built in order to estimate the capability to translate the signal to temperature. FIG. 13, which is a graph of detector output signal against temperature, describes the output of the mathematical model. This mathematical model was used in order to investigate the accuracy that can be obtained using minimum mean square error polynomial approximation to the modeled video signal. For a relatively small dynamic range of about 60 degrees Celsius a second order polynomial expansion gives an acceptable accuracy. For example, a second order polynomial expansion is adequate in order to model the optics contribution to the video signal. The third order polynomial approximation covers, with an acceptable error, a range of 300 degrees Celsius, while the fourth polynomial approximation spans a range of about 400 degrees Celsius.

The minimum mean square error polynomial expansion of order L that samples the data at Q different values, requires the solution of L+1 linear set of equations. However, the arithmetic used in order to solve the linear set of equations has to be carefully chosen. The minimum number included in the linear set of equations is Q, while the largest number is $$\sum_{i=1}^{Q} Sif_i^{2L}.$$

Figure 14A:
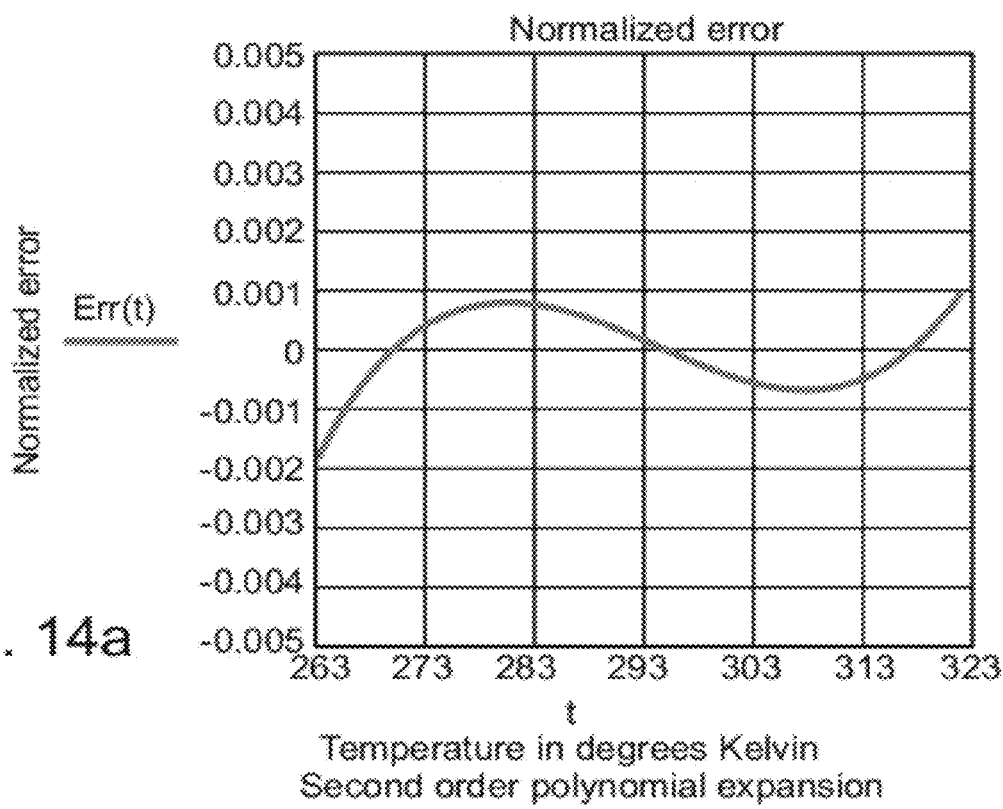
FIGS. 14a and 14b are graphs, which show a second order polynomial expansion.
Figure 14B:
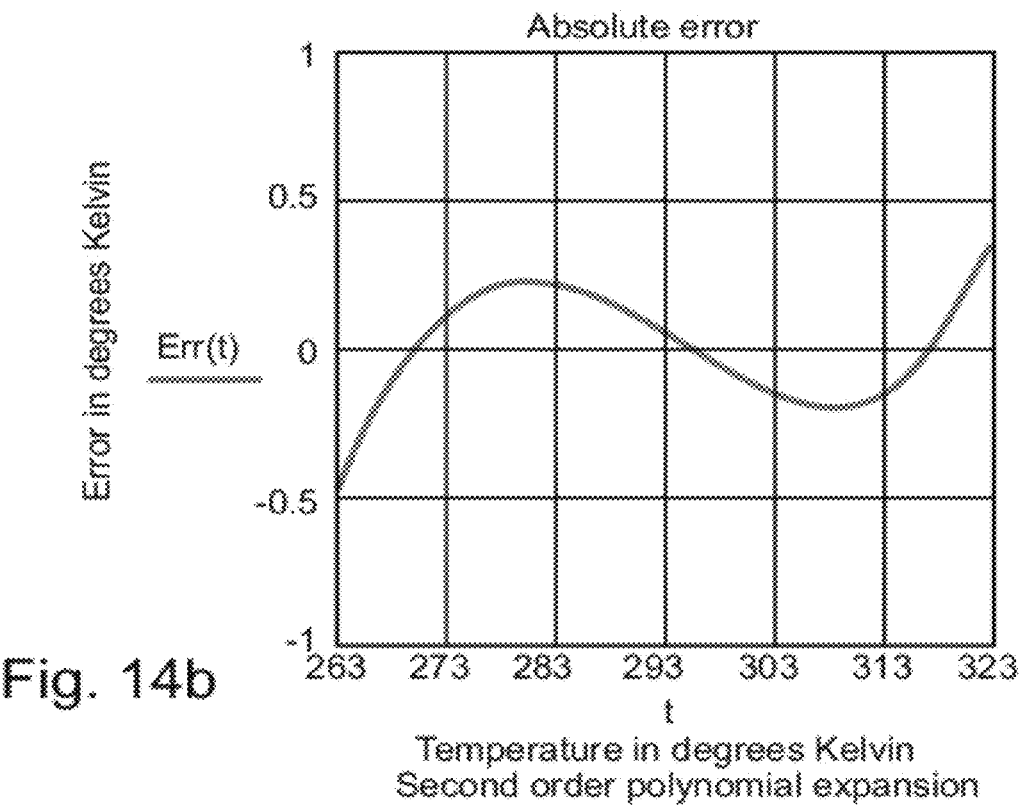
Figure 16A:
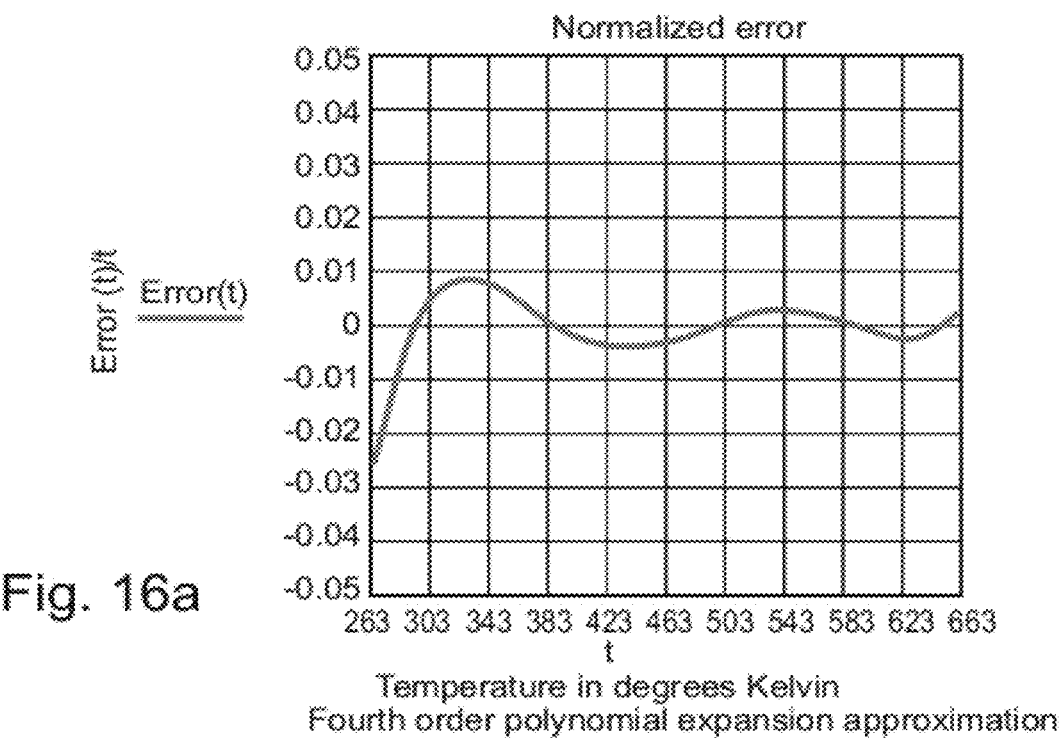
FIGS. 16a and 16b are graphs which show a fourth order polynomial approximation.
Figure 16B:
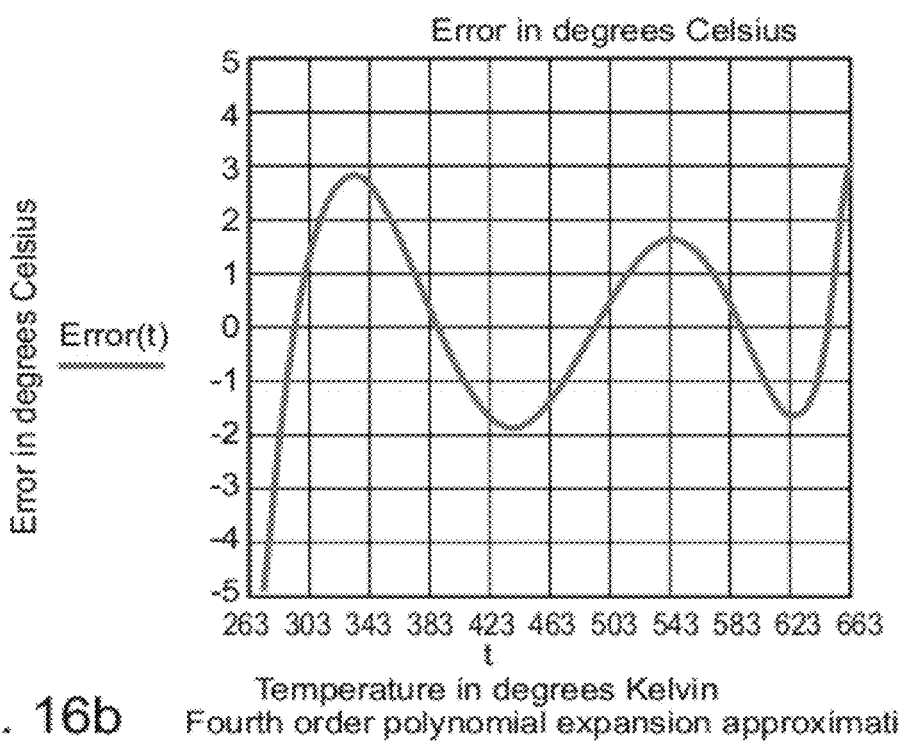

FIGS. 14a and 14b are graphs which show a Second order polynomial approximation. The normalized error is shown in FIG. 14a, the temperature error in FIG. 14b. FIGS. 15a and b are graphs which show a third order polynomial approximation. FIG. 15a shows a normalized error and FIG. 15b shows a temperature error. FIGS. 16a and b are graphs which show a fourth order polynomial approximation. FIG. 16a shows a normalized error and FIG. 16b shows a temperature error.

The graphs presented in FIGS. 14a and b, FIGS. 15a and b, and FIGS. 16 a and b have been calculated using high arithmetical accuracy. A practical solution might be to divide the temperature range into a number of small regions (including some small overlap between the regions), using a lower-order polynomial expansion at each region. Up to this point the temperature influence of the optics has been ignored. The following paragraph describes a further solution in order to deal with the temperature influence of the optics.

The temperature second approximation described in Equation 6 is based on the existence of a function F that translates the detector signal into temperature.

$$T\_mes = \qquad \text{Equation 7}$$
$$F(Sig - As_n) + \frac{F(As_n - As_{n-1}) - (Tf_n - Tf_{n-1})}{Td_n - Td_{n-1}}(Td - Td_n)$$
$$F(Sig - As_n) = \sum_{l=0}^{\infty} a_l \cdot (Sig - As_n)^l.$$

As was explained hereinabove, the amount of energy exchanged between the detector and the optics is not negligible. Assuming that the optics temperature influence can be expressed by a polynomial expansion of order R and assuming that the detector signal translation to temperature can be described by a polynomial expansion of order L, the most general form of function F is given by:

$$F(Sig, To) = \qquad \text{Equation 8}$$
$$\sum_{l=0}^{L}\left(\sum_{r=0}^{R} a_{r,l} \cdot To^r\right) Sig^l \text{[Temperature in degrees Kelvin]}.$$

The minimum mean square error algorithm can calculate the constants $a_o$ assuming that the detector's signal has been acquired for different view and optics temperatures. The number of linear equations that have to be simultaneously solved is $(L+1)(R+1)$. A 32-bit floating point arithmetic unit does not provide adequate accuracy for such a task. Therefore we separate the view temperature from the optics influence. Instead of having one single F function, there are several functions $F_{To}(Sig)$ that cover the optics ambient temperature range in small steps of 5 degrees.

$$F_{To}(Sig) = \sum_{l=0}^{L} a_{To,l} \cdot Sig^l \qquad \text{Equation 9}$$

The optics change in temperature is relatively slow. Consequently, the additional work performed by the digital signal processor (DSP) in order to calculate, by linear interpolation, the required $a_{To,l}$ constants for the new optics temperature is negligible.

In order to build a real radiometer, additional variables have to be taken into account, such as the target emissivity and ambient temperature influence. In particular we mention the influence of the system modulation transfer function (MTF) on temperature measurement accuracy. Due to this influence, a given object, even though it is at a constant temperature, will show different temperatures at different distances from the camera. The MTF influence can be compensated, at least for some limited spatial frequency range.

Figure 17:
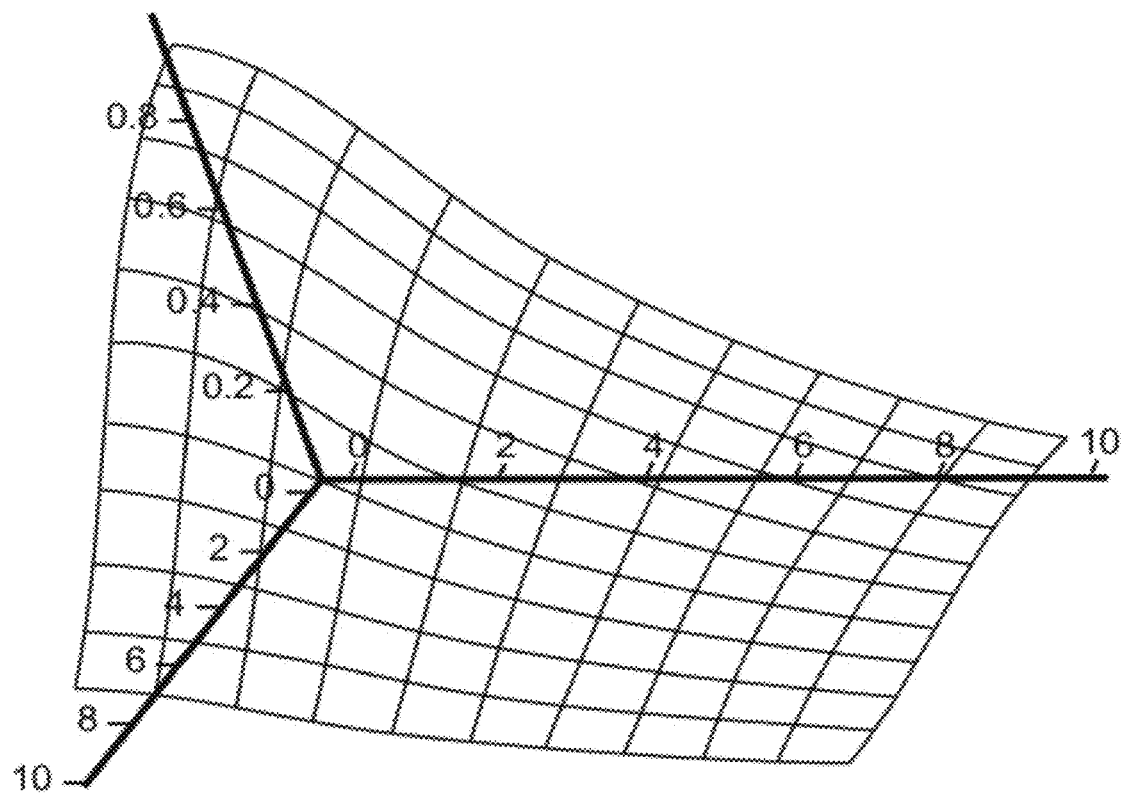
FIG. 17 is a Fourier transform of camera impulse response in cycles per mm, including optics detector and electronics.

Such a response is illustrated by FIG. 17, which is a Fourier transform of camera impulse response in cycles per mm, including optics detector and electronics.

FIG. 17 describes a typical two-dimensional Fourier transform of an uncooled microbolometer camera. In order to compensate the MTF degradation versus spatial frequency, an inverse filter to the MTF response was designed and implemented in software. FIG. 6 above represents the high pass frequency response of an inverse filter designed in order to compensate the MTF degradation.

EXAMPLES

An implementation of the above-described embodiments was constructed to provide an instrument designed to detect human beings suffering from fever. The instrument monitors the face temperature and any area in the image which is above a predetermined temperature threshold is made to flicker. For such an application the instrument only needs to cover a relatively very small temperature range. A range of 30 to 42 degrees Celsius is more than adequate and can be covered with an accuracy of ±0.25 degrees Celsius. Such an embodiment has applications for use in airports as a convenient and non-invasive detector for screening for carriers of SARS and like infective illnesses.

The basic concept of temperature measurement using a regular uncooled microbolometer detector is thus provided. The additional hardware required for the temperature measurement capability is limited and inexpensive, thus allowing existing devices to be easily upgraded. It is reasonable to expect that the capability to measure internal temperature and thus to provide the necessary compensation will expand the applications span of the regular uncooled microbolometer FUR cameras.

It is expected that during the life of this patent many relevant microbolometers and other infra-red detection pixels and arrays will be developed and the scope of the corresponding terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An infra-red imaging camera comprising:
    an uncooled and unshielded detector comprising an array of infra-red (IR) sensors arranged to detect infra red radiated energy, said array comprising a plurality of IR sensors,
    a non-uniformity corrector, associated with said detector, operable to perform non-uniformity correction on outputs of said array to provide uniform outputs having a uniform response to energy detected at said uncooled sensor,
    a calibrator to carry out periodic calibration operations by taking at least one calibration temperature measurement of a temperature of a shutter of said camera while said shutter is closed, using a first temperature sensor located on said shutter, and to derive a reference temperature from said at least one calibration temperature measurement, said reference temperature being a temperature indicative of radiated energy not from an external scene, and a reference level comprising an average video signal of said IR sensors at the time of said calibration temperature measurement, said average being taken over said plurality of IR sensors, and to calculate a temperature of objects in said camera's field of view for each of said plurality of IR sensors from a difference between a respective uniform output of said sensor and said reference level, said temperature being calculated using a same signal to temperature function for each of said sensors, wherein said reference temperature is an offset of said function, and focusing optics configured for gathering infra-red energy from an external scene, said focusing optics being entirely located to define an optical unit;

wherein said shutter is positioned between said optical unit and said detector.

2. The infra-red imaging camera of claim 1, configured to combine a value from an initial calibration temperature measurement with a second value taken from a second calibration temperature measurement, said combining using a time-dependent function, to produce extrapolations of said reference temperature for later points in time after said calibration temperature measurements.

3. The infra-red imaging camera of claim 2, wherein said time-dependent function comprises a mathematical extrapolation function from most recent calibration temperature measurements.

4. The infra-red imaging camera of claim 1, wherein said calibrator is further configured to measure a respective second reference temperature during an external temperature measurement using a second temperature sensor located on a housing of said camera, wherein said respective second reference temperature is a further parameter of said signal to temperature function for said external temperature measurement.

5. The infra-red imaging camera of claim 1, having a camera thermal time constant of a first duration, and wherein said calibrator is configured to make a plurality of said calibration temperature measurements during said first duration.

6. The infra-red imaging camera of claim 1, wherein a first thermistor is located on a shutter of said camera, a second thermistor is located on an external surface of detector's vacuum packaging of said camera and a third thermistor is located on a casing surrounding said optics of said camera, and wherein said calibration temperature measurement comprises taking readings from each of said thermistors.

7. The infra-red imaging camera of claim 1, wherein said shutter comprises a sheet having an emissivity substantially approaching 1 within a spectral frequency range used by said detector, and wherein said calibrator is configured to make a further calibration temperature measurement by measuring radiation from said shutter.

8. The infra-red imaging camera of claim 1, wherein said shutter comprises a sheet having a reflectivity substantially approaching 1 within a spectral frequency range used by said detector, and wherein said calibrator is configured to make a further calibration temperature measurement by measuring radiation reflected from said shutter, said radiation being indicative of a temperature of said uncooled detector.

9. The infra-red imaging camera of claim 1, wherein said uncooled detector comprises a microbolometer array.

10. The infra-red detector of claim 1, operable to make said calibration temperature measurements at an interval of time less than the camera thermal time constant.

11. Temperature correction apparatus, for correcting a response of a radiometer in accordance with a local camera temperature, said radiometer comprising:

an unshielded uncooled infra-red (IR) detector comprising an array of IR sensors, said array comprising a plurality of IR sensors, configured for providing an image response in order to form a temperature image in accordance with IR radiation impinging on said IR detector's field of view (FOV), focusing optics configured for gathering infra-red energy from an external scene, said focusing optics being entirely located to define an optical unit;

a shutter, configured for controllably obscuring said FOV, an internal face of said shutter forming a measurement surface for an internal temperature reference unit, wherein said shutter is positioned between said optical unit and said detector;

a non-uniformity corrector, associated with said detector, operable to perform non-uniformity correction on outputs of said array to provide uniform outputs having a uniform response to energy detected at said uncooled sensor, said temperature correction apparatus comprising:

a temperature sensor configured for determining a local camera temperature while said shutter is closed using said measurement surface, a referencer, configured for deriving a reference temperature from said local camera temperature, said reference temperature being a temperature indicative of radiated energy not from an external scene, and for using a response of said IR sensor to said local camera temperature to approximate a temporal effect of temperature drift of said local temperature; and a signal corrector associated with said temperature sensor and said referencer, said signal corrector being configured to discount impinging IR radiation not from an external source by calculating a temperature of objects in said radiometer's field of view for each of said plurality of IR sensors from a difference between a respective uniform output of said sensor and a reference level comprising an average video signal of said IR sensors at the time of said local camera temperature measurement, said average being taken over said plurality of IR sensors, said temperature being calculated using a same signal to temperature function for each of said uniform outputs, wherein said reference temperature is an offset of said function.

12. Temperature correction apparatus according to claim 11, wherein said approximation is a mathematical functional approximation based on previous measured data.

13. Temperature correction apparatus according to claim 11, wherein said IR sensor array is operable to provide a two-dimensional image.

14. Temperature correction apparatus according to claim 11, wherein said IR detector comprises an array of microbolometers.

15. A method for correcting a response of an uncooled and unshielded a radiometer in accordance with a calibration temperature measurement, said radiometer comprising focusing optics for gathering infra-red energy from an external scene, said focusing optics being entirely located to define an optical unit, an array of infra-red (IR) sensors, for providing an image response in order to form a temperature image in accordance with IR radiation impinging on said IR sensor's field of view (FOV), said array comprising a plurality of IR sensors, and a shutter, for controllably obscuring said FOV, wherein said shutter is positioned between said optical unit and said radiometer, said method comprising:

performing, while said FOV is obscured by said shutter, a calibration temperature measurement to determine a temperature of said shutter;

performing non-uniformity correction (NUC) on outputs of said array to provide uniform outputs having a uniform response to energy detected at said uncooled sensor;

deriving from said temperature of said shutter a first reference temperature, said first reference temperature being a temperature reflecting impinging IR radiation not from an external source;

determining a reference level comprising an average video signal, said average being taken over said plurality of IR sensors at the time of said calibration temperature measurement; and calculating a temperature of objects in said radiometer's field of view for each of said sensors from a difference between a respective uniform output of said sensor and said reference level, said temperature being calculated using a same signal to temperature function for each of said uniform outputs, wherein said first reference temperature is an offset of said function.

16. A method according to claim 15, further comprising determining a time dependent response of said radiation sensor to said temperature of said shutter; and using said time-dependent response in modifying said temperature calculations in between determinations of said reference temperature.

17. A method for correcting a response of a radiometer according to claim 15, further comprising filtering said corrected image response to compensate camera MTF effects.

18. A method according to claim 15, further comprising measuring a respective second reference temperature during an external temperature measurement using a second temperature sensor located on a housing, wherein said respective second reference temperature is a further parameter of said signal to temperature function for said external temperature measurement.

* * * * *